US007351466B2

(12) United States Patent
Simmons, Jr.

(10) Patent No.: US 7,351,466 B2
(45) Date of Patent: Apr. 1, 2008

(54) DUNNAGE CONVERSION MACHINE, METHOD AND DUNNAGE PRODUCT

(75) Inventor: James A. Simmons, Jr., Painesville Township, OH (US)

(73) Assignee: Ranpak Corp., Concord Township, OH (US)

( * ) Notice: Subject to any disclaimer, the term of this patent is extended or adjusted under 35 U.S.C. 154(b) by 0 days.

(21) Appl. No.: 11/323,540

(22) Filed: Dec. 30, 2005

(65) Prior Publication Data

US 2006/0111228 A1 May 25, 2006

Related U.S. Application Data

(60) Division of application No. 10/373,385, filed on Feb. 24, 2003, now Pat. No. 7,044,903, which is a continuation of application No. PCT/US01/26460, filed on Aug. 24, 2001.

(60) Provisional application No. 60/227,522, filed on Aug. 24, 2000.

(51) Int. Cl.
*B32B 3/02* (2006.01)

(52) U.S. Cl. ...................... 428/126; 428/130; 428/152; 428/153; 428/154; 206/584; 206/814; 493/967

(58) Field of Classification Search ................ 428/152, 428/153, 154, 121-130; 206/814, 584; 493/967
See application file for complete search history.

(56) References Cited

U.S. PATENT DOCUMENTS

| | | | | |
|---|---|---|---|---|
| 2,679,887 A * | 6/1954 | Doyle et al. | 156/183 |
| 3,509,798 A | 5/1970 | Johnson | |
| 4,750,896 A | 6/1988 | Komaransky et al. | |
| 4,884,999 A | 12/1989 | Baldacci | |
| 4,937,131 A * | 6/1990 | Baldacci et al. | 428/131 |
| 4,968,291 A * | 11/1990 | Baldacci et al. | 493/354 |
| 5,082,255 A | 1/1992 | Brigante et al. | |
| 5,527,255 A | 6/1996 | Mansfield | |
| 5,607,383 A | 3/1997 | Armington et al. | |
| 5,713,825 A | 2/1998 | Ratzel | |
| 5,755,656 A | 5/1998 | Beierlorzer | |
| 6,035,613 A | 3/2000 | Lencoski et al. | |
| 6,090,033 A | 7/2000 | Simmons, Jr. | |
| 6,113,525 A | 9/2000 | Waechter | |
| 6,207,249 B1 | 3/2001 | Lencoski et al. | |
| 6,277,459 B1 | 8/2001 | Lencoski et al. | |
| 6,387,029 B1 | 5/2002 | Lencoski | |
| 6,503,182 B2 | 1/2003 | Toth | |

FOREIGN PATENT DOCUMENTS

| | | |
|---|---|---|
| EP | 0 888 879 A | 1/1999 |
| WO | WO/0026015 | 5/2000 |

* cited by examiner

*Primary Examiner*—Alexander S. Thomas
(74) *Attorney, Agent, or Firm*—Renner, Otto, Boisselle & Sklar, LLP

(57) ABSTRACT

A dunnage conversion machine is characterized by a forming assembly which causes lateral edge portions of a substantially continuous sheet stock material to crumple and to fold upon themselves, leaving an unfolded central portion between the laterally spaced apart folded portions. The layers of sheet stock material in the folded portions are fixed by a feeding/fixing assembly having two pairs of laterally spaced feed assemblies to form a dunnage product which does not come apart as it is manipulated. A severing assembly severs discrete dunnage products from the continuous strip of dunnage.

11 Claims, 5 Drawing Sheets

DUNNAGE CONVERSION MACHINE, METHOD AND DUNNAGE PRODUCT

This application is a divisional of U.S. patent application Ser. No. 10/373,385 filed on Feb. 24, 2003, now U.S. Pat. No. 7,044,903, which is a continuation of International Patent Application No. PCT/US01/26460, filed Aug. 24, 2001 and published in English on Feb. 28, 2002 under International Publication No. WO 02/16120 A2, which claims the benefit of U.S. Provisional Patent Application No. 60/227,522, filed Aug. 24, 2000, each of which is hereby incorporated herein by reference in its entirety.

FIELD OF THE INVENTION

The herein described invention relates generally to a dunnage conversion machine and method for producing a dunnage product from sheet stock material, and more particularly, to an improved machine and method for producing a void-fill dunnage product from a sheet stock material.

BACKGROUND OF THE INVENTION

In the process of shipping an article from one location to another, a protective packaging material is typically placed in the shipping case, or box, to fill any voids, to block, to brace and/or to cushion the article. Various types of packing products have been used to pack articles in shipping containers, including a crumpled paper dunnage product. Paper is a biodegradable and recyclable material composed of a renewable resource, making it an environmentally responsible raw material.

Various types of conversion machines heretofore have been used to convert sheet stock material into a dunnage product. The conversion of sheet material into a crumpled dunnage product may be accomplished by a cushioning conversion machine, such as those disclosed in U.S. Pat. Nos. 4,750,896; 4,884,999; and/or 5,607,383. (These patents are assigned to the assignee of the present application and their entire disclosures hereby are incorporated herein by reference.) Each of the cushioning conversion machines disclosed in the above-identified patents includes a conversion assembly which converts sheet stock material composed of one or more plies into a relatively less dense three-dimensional cushioning product. The conversion assembly includes a forming assembly which forms the sheet stock material into a strip of cushioning that is severed to form discrete pads useful as a packing material.

Prior art cushioning products have included a pair of pillow portions formed by inwardly turned lateral edge portions of one or more of the layers of stock paper. The central region of this structure is compressed and connected to form a central compressed portion between the pillow portions.

Although the cushioning conversion machines disclosed in the above-identified patents adequately perform their connecting and other functions, they generally are limited in the speed with which the cushioning product can be produced. In addition, although cushioning products produced by cushioning conversion machines can be used as void-fill dunnage, the process of forming a cushioning product from sheet stock material generally results in a yield lower than what might otherwise be needed for use as a void-fill. The lower yield is caused in part by crimp loss, i.e., a loss of longitudinal length of the resulting cushioning product relative to the length of the starting sheet stock material. In a void-fill dunnage product, which usually does not need substantial cushioning properties, it would be desirable to reduce longitudinal crumpling to minimize crimp loss and increase the length of the produced dunnage relative to the length of the starting sheet stock material, while also greatly increasing the speed at which a given length of dunnage is produced.

SUMMARY OF THE INVENTION

The present invention provides a dunnage conversion machine and method capable of rapidly producing a dunnage product from sheet stock material using the machine, and a dunnage product particularly useful as a void-fill dunnage product.

In accordance with one aspect of the invention, a dunnage conversion machine for converting sheet stock material into a dunnage product includes a forming assembly and a feeding/fixing assembly downstream of the forming assembly. The feeding/fixing assembly advances sheet stock material from a supply thereof along the forming assembly, whereby the feeding/fixing assembly cooperates with the forming assembly to cause inward folding and crumpling of lateral edge portions of the sheet stock material to form a strip of dunnage having laterally spaced apart folded crumpled edge portions. The feeding/fixing assembly also includes laterally spaced-apart feeding/fixing members which respectively engage the folded crumpled edge portions to feed the sheet stock material through the machine and to fix the folded crumpled edge portions in a folded crumpled state.

According to one or more embodiments of the invention, the feeding/fixing members each include a pair of rotating members between which the respective folded crumpled edge portion of the strip of dunnage passes, at least one of the rotating members of each pair is rotatably driven, the rotating members include gear members having intermeshed teeth for mechanically deforming the respective folded crumpled edge portion to impart permanent deformation therein, at least one of the rotating members of each pair has on the outer diameter thereof projections and recesses for enhancing engagement with the respective folded crumpled edge portion, and/or the rotating members rotate about axes which are parallel to a width dimension of the sheet stock material. The feeding/fixing assembly may include a biased pressure shoe which minimizes lateral folding of a central portion of the sheet stock material downstream of the forming assembly, and/or the pressure shoe may be positioned between the laterally spaced-apart feeding/fixing members.

According to one or more further embodiments of the invention, the forming assembly includes a chute and a former which define a path therebetween for the passage of the sheet stock material, with the former extending into the chute such that the stock material passes between the former and the chute, the former has the shape of a generally flat plate, the former has a generally triangular shape, the former is angularly adjustable relative to the chute, the former is longitudinally adjustable relative to the chute, the former is mounted to the chute, and/or the chute is a converging chute.

According to another aspect of the invention, a method of converting sheet stock material into a dunnage product, includes: causing laterally spaced apart edge portions of the sheet stock material to fold and to crumple inwardly to form a strip of dunnage having laterally spaced apart folded crumpled edge portions; and fixing the folded crumpled edge portions in a folded crumpled state.

According to one or more embodiments of the invention, causing includes feeding the sheet stock material along a forming assembly, and/or causing includes causing the laterally spaced apart edge portions to fold over a same side of the sheet stock material. In addition or alternatively, fixing includes mechanically interlocking the layers of sheet stock material in the lateral edge portions, fixing includes perforating the layers of sheet stock material, and/or the method further includes severing dunnage products from a continuous strip of dunnage.

According to yet another aspect of the invention, a dunnage product includes n plies of sheet stock material having laterally spaced apart edge portions folded upon themselves and crumpled to form laterally spaced apart folded crumpled edge portions separated by a central portion, where n is a whole number greater than or equal to one.

According to one or more embodiments of the invention, the laterally spaced apart folded crumpled edge portions are at least 2*n layers thick and are separated by the central portion which is n layers thick, the dunnage product is formed of multiple plies of sheet stock material, the folded portions are of approximately equal width, the multiple layers of sheet stock material in the folded portions are fixed to maintain the folded portions in their folded condition, the multiple layers of sheet stock material in the folded portions are mechanically interconnected to maintain the folded portions in their folded condition, and/or the dunnage product further includes a plurality of perforations through the multiple layers of sheet stock material in the folded portions.

Although the cushioning properties of the dunnage product produced in accordance with the present invention may be less than other dunnage products, the dunnage product may be sufficient for some cushioning applications. The dunnage product is particularly advantageous for use as a void-fill dunnage product as it can be produced quickly, yet the dunnage product of the present invention retains its shape, fills empty packaging space, and resists settling and shifting during transport. In addition, the folded portions of the dunnage product have increased stiffness relative to the sheet stock material, thereby facilitating the production of the dunnage product and reducing jamming of the sheet stock material in the dunnage conversion machine, while also facilitating the movement of severed sections of dunnage product out of the machine.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
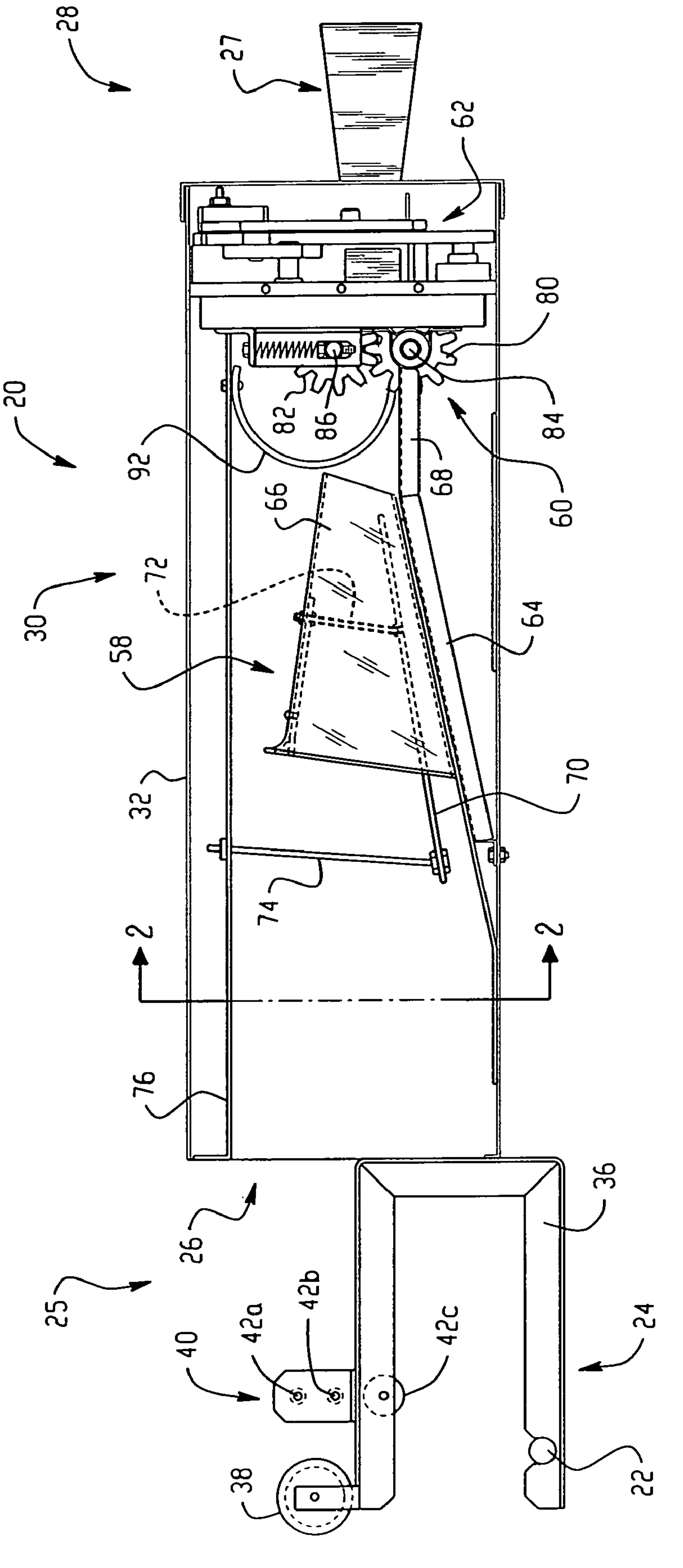
FIG. 1 is a side view of a dunnage conversion machine with a side panel of the machine's housing nearest the viewer removed to permit viewing of internal machine components.

Referring now to the drawings in detail, and initially to FIG. 1, a dunnage conversion machine 20 according to the present invention is illustrated. The machine is capable of quickly converting sheet stock material into a dunnage product that is particularly suitable for use as void-fill dunnage. The machine also produces a void-fill dunnage product that may have less crimp loss compared to known prior art cushioning products resulting in greater lengths of dunnage from the same length of sheet stock material.

The sheet stock material generally consists of one or more superimposed webs or plies of kraft paper of any desired basis weight, although other types of sheet stock material may be used. The sheet stock material generally is tightly wrapped around a hollow core formed by a cardboard tube to form a stock roll (not shown). A disposable plastic plug may be inserted into each end of the tube to accommodate a difference between the inner diameter of the tube and the outer diameter of a stock roll holder, such as an axle or a spindle 22, used to support the stock roll on the conversion machine 20. For further information about this and other types of stock roll holders, see U.S. Pat. No. 5,749,539 which is commonly owned by the assignee of the present invention, and the entire disclosure therein is incorporated herein by reference.

The machine 20 generally includes a stock supply assembly 24 at an upstream end 25 of the machine (the terms "upstream" and "downstream" are used herein in relation to the direction of flow of the stock material through the machine, from a stock inlet opening 26 at the upstream end toward an output chute 27 at a downstream end 28) that supplies the sheet stock material. A conversion assembly 30 is enclosed in a housing 32 downstream of the stock supply assembly 24 and converts the sheet stock material into the dunnage product.

In the illustrated conversion machine 20, the stock supply assembly 24 includes a pair of laterally spaced U-shape brackets 36, a lower portion of which supports the ends of the stock roll spindle 22 supporting a stock roll (not shown), and an upper portion of which supports a constant-entry device 38 downstream of the stock roll spindle, and a separating device 40 downstream of the constant-entry device.

The stock supply assembly 24 also may include a brake mechanism (not shown) to prevent or minimize stock roll overrun during starting and stopping of the machine 20, which causes significant variation in the amount of tension acting on the stock material being fed into the machine. The problem of overrun results from the rotational momentum of the stock roll causing the stock roll to continue rotating after the stock material is no longer being fed into the machine. This becomes a problem when the machine resumes the feeding of the stock material: as the slack is taken up, the tension in the stock material increases sharply and can lead to tearing in the stock material. The brake mechanism can minimize this problem by providing a frictional drag on the rotation of the stock roll. Exemplary brake mechanisms for a stock roll on a cushioning conversion machine are disclosed in commonly owned U.S. Pat. No. 6,090,033, and U.S. patent application Ser. No. 60/211,056, filed on Jun. 13, 2000, both of which are hereby incorporated herein by reference. However, other stock roll brake mechanisms performing similar functions may be used in accordance with the invention to limit overrun of the stock roll as the stock material is payed out.

Stock material payed off the stock roll passes over the constant-entry device or roller 38. The constant-entry device provides a substantially constant point of entry for the sheet material from the stock roll into the separating device 40 and the conversion assembly 30 regardless of the diameter of the stock roll. Thus when a different diameter roll is used and/or as the stock roll dispenses stock material and decreases in diameter, the point of entry of the stock material into the separating device remains constant. This consistency is believed to facilitate the production of a uniform dunnage product.

Alternatively, a spring-biased constant-entry device (not shown) may be used. Such a constant-entry device additionally functions temporary as a force dampening device during a high tension situation, such as during start-up when it is necessary to overcome the starting inertia of the stock roll. Once the high tension situation is relieved, the constant-entry device automatically returns to its normal operating position which remains substantially constant as the sheet stock material is fed into the machine 20. From the constant-entry device, the sheet stock material passes to the separating device.

Figure 3:
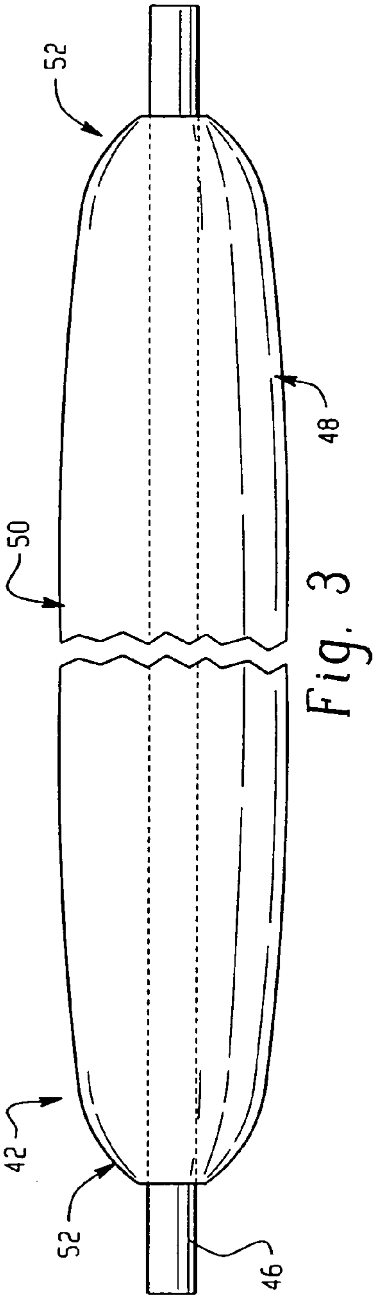
FIG. 3 is an elevation view of a separating member from the machine of FIG. 1.

The separating device 40 separates the one or more plies of paper prior to their passing to the conversion assembly 30 and includes at least one separating member. The number of separating members, shown as three in the drawings—an upper member 42*a*, an intermediate member 42*b*, and a lower member 42*c*—generally corresponds to the number of plies or webs of stock material. An exemplary separating member 42 is shown in FIG. 3, having a shaft 46 about which the member rotates, and a sleeve 48 having a relatively thicker center portion 50 and reduced diameter rounded ends 52 which facilitate relief of excessive edge tension in lateral edges of the sheet stock material that contributes to tearing. For further information about these and other types of constant-entry devices and/or separating devices, U.S. patent application Ser. No. 09/294,958, is hereby incorporated herein by reference in its entirety. This application is commonly owned by the assignee of the present invention. Returning to FIG. 1, as the sheet stock material passes the separating device 40 it leaves the stock supply assembly 24 and enters the conversion assembly 30.

The conversion assembly 30 includes a forming assembly 58 and a feeding/fixing assembly 60. A severing assembly 62 also is provided. The forming assembly is located downstream of the stock supply assembly 24 interiorly of the housing 32. The forming assembly, as the stock material is drawn therealong, cooperates with the feeding/fixing assembly 60 to cause inward folding and crumpling of lateral edge portions of the sheet stock material to form a strip of dunnage having laterally spaced apart folded crumpled edge portions. The feeding/fixing assembly 60 is located downstream of the forming assembly 58 to pull or feed the sheet stock material along the forming assembly and to fix the juxtaposed multiple layers of sheet stock material in the folded portions to maintain their folded condition. The severing assembly 62 is mounted downstream of the feeding/fixing assembly 60 to sever discrete sections of dunnage product, such as for use as a void-fill dunnage. Reference may be had to U.S. patent application Ser. No. 08/386,355 for a severing assembly similar to that illustrated, or to U.S. patent application Ser. No. 08/110,349 for another type of severing assembly. These applications are commonly owned by the assignee of the present invention, and the entire disclosures therein are hereby incorporated herein by reference.

The forming assembly 58 is provided with a guide ramp 64 to which a shaping chute 66 is mounted, the guide ramp having an extended guide surface 68 portion extending from the downstream end of the shaping chute into close proximity to the feeding/fixing assembly 60.

Figure 2:
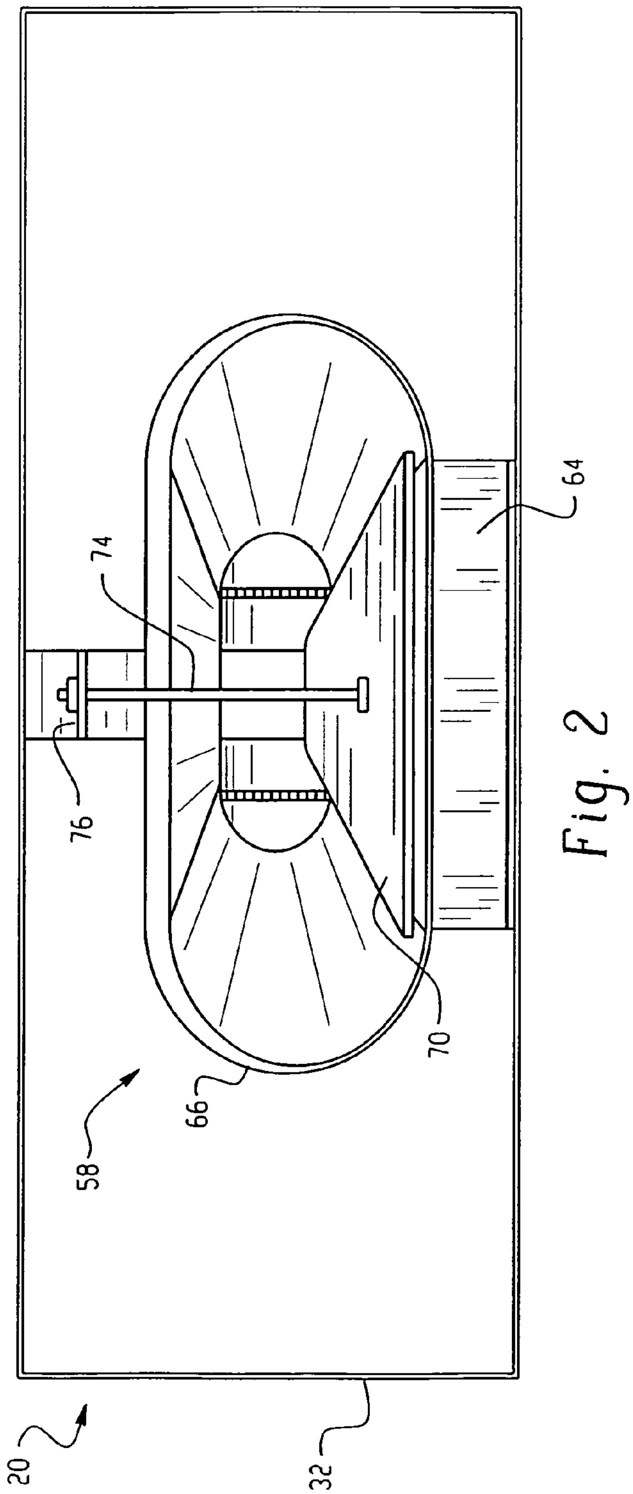
FIG. 2 is a cross-sectional view of the machine as seen along line 2-2 of FIG. 1.

As shown in FIGS. 1 and 2, the forming assembly 58 also includes a forming member or former in the shape of a generally solid triangular plate 70 at least partially disposed within the chute 66. The chute has a generally flattened, hollow cone shape with a widened mouth or entranceway opening in the direction of the stock supply assembly 24 (the upstream end) with the body of the chute converging in the downstream direction toward the feeding/fixing assembly 60 and terminating in an exit. The chute is flattened along its vertical plane thus leading to a generally oval shape entranceway and exit. The triangular plate 70 is situated so as to extend into the chute with the base of the triangular plate facing the upstream end of the machine 20, and the sides of the triangular plate converging at approximately the same rate as the adjacent curved inner surfaces of the chute, with edge surfaces of the triangular plate extending into the space enclosed by the curved inner surfaces of the chute. The apex of the triangular plate is generally near the exit of the chute. The triangular plate also has rounded corners to reduce the chance for the stock material to catch and tear thereon, thereby enabling the sheet stock material to be fed through the forming assembly rapidly. The downstream end of the triangular plate may be flattened to give the triangular plate a trapezoidal shape. Although the illustrated forming member is particularly useful, other types of forming members and/or forming assembly configurations may be used to effect inward turning of the lateral edge portions of the stock material.

In operation, the sheet stock material passing along the forming assembly 58 passes between the triangular plate 70 and the lower portion of the chute 66. The triangular plate and the chute are sized relative to each other and relative to the width of the stock material so that the curved inner surfaces of the chute and the triangular plate cooperate to cause the lateral edges of the stock material passing along the forming assembly to fold inwardly upon themselves and crumple to form a continuous strip having laterally spaced apart folded crumpled edge portions. The triangular plate is spaced from the curved side walls and flat top wall of the chute to permit the lateral edges of the sheet stock material to crumple therebetween as it passes through the chute, thereby further increasing the thickness or loft of the folded portions. The spacing of the triangular plate from the bottom wall of the chute and the guide plate 64, however, minimizes or substantially eliminates crumpling of a central portion of the sheet stock material as it passes therebetween, providing a substantially flat central portion with less thickness than the folded portions. However, it may be desirable for substantial crumpling to occur in the central portion of the stock material, and in certain instances it may be desirable to provide a forming assembly which encourages crumpling in the central portion of the stock material.

The triangular plate 70 is supported in position in the chute 66 at an intermediate point along the plate by a rod 72 which extends to a top portion of the chute, and at its upstream end, for example, by another rod 74 extending from a frame element 76 of the machine 20. The folded strip of dunnage passes to the feeding/fixing assembly 60 from the forming assembly 58.

The feeding/fixing assembly 60 in the illustrated machine 20 performs two functions. The feeding/fixing assembly feeds the stock material through the machine, as by pulling the stock material from the stock supply assembly 24 and along the forming assembly 58. The feeding/fixing assembly also fixes juxtaposed layers of sheet stock material in the folded portions of the strip to maintain the three-dimensional shape of the folded portions, i.e., to keep some loft in the crumpled folded portions and to prevent or minimize unfolding of the folded portions of the dunnage product as it is manipulated. These dual functions are carried out by one or more pairs of feeding/fixing members, formed, for example, by rotating stitching elements such as two laterally spaced apart pairs of gear-like members 80 and 82 in the illustrated embodiment. The gear-like members (herein also referred to as gears) are described in greater detail in the following paragraphs.

Figure 4:
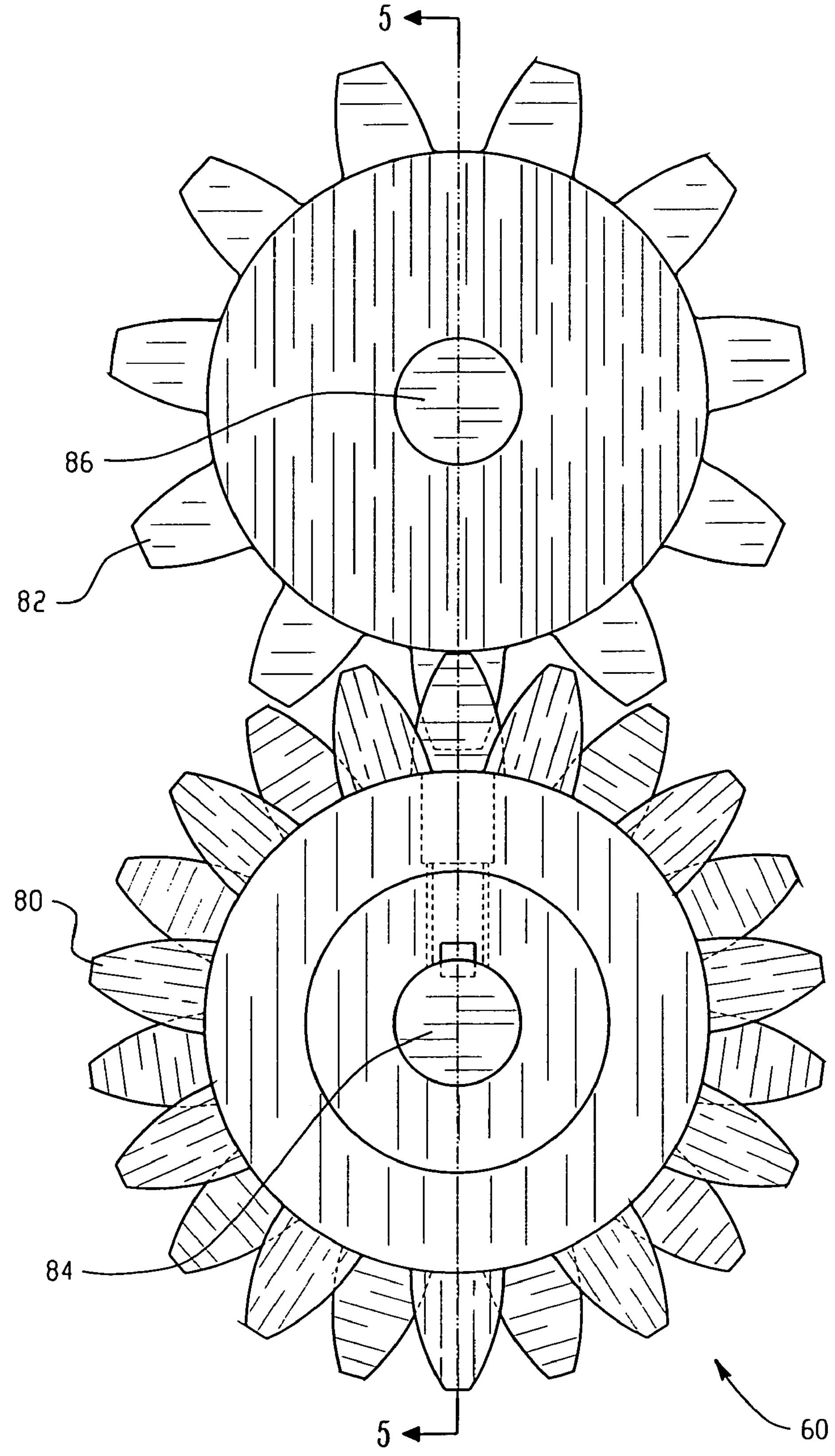
FIG. 4 is a side view of connecting elements of the machine of FIG. 1.
Figure 5:
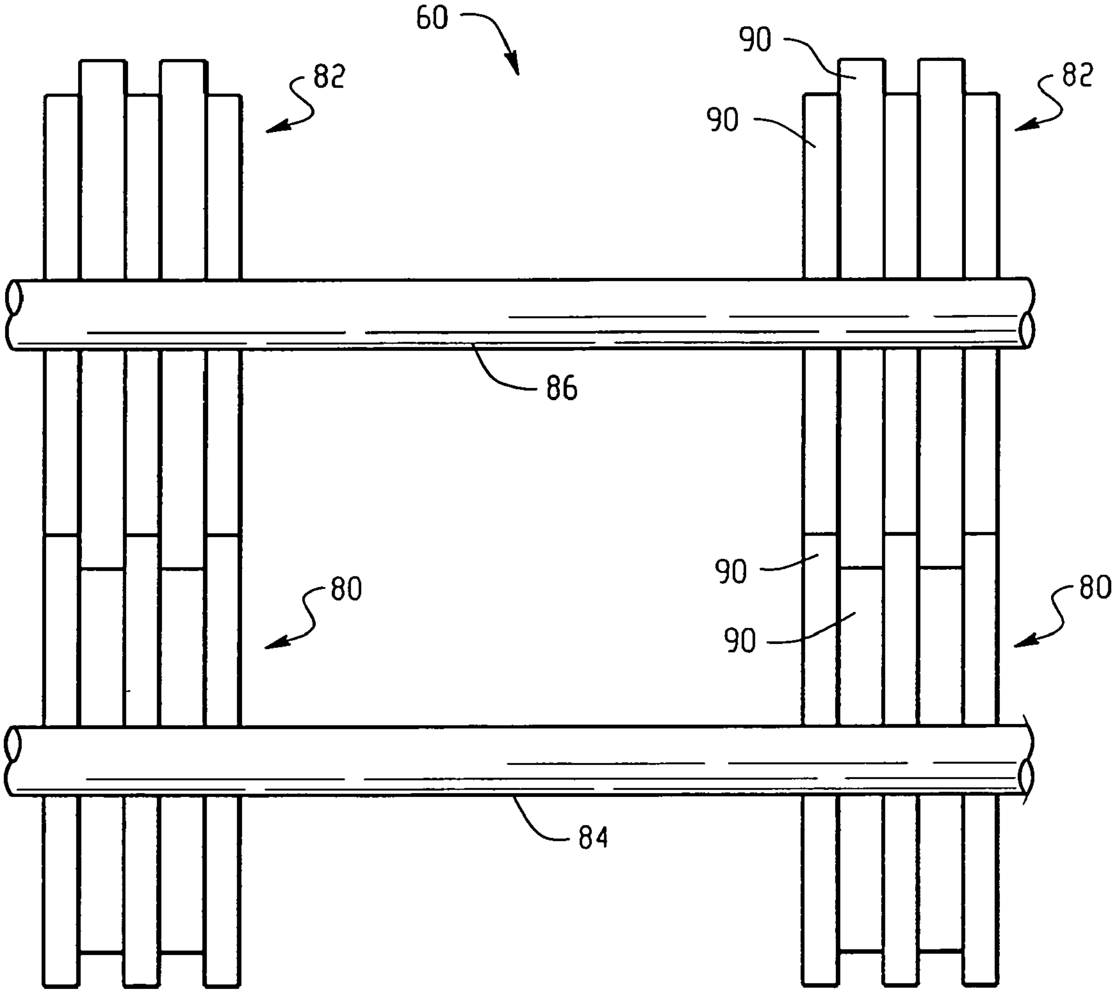
FIG. 5 is a sectional front view of the connecting elements shown in FIG. 4 as see along line 5-5.

In the illustrated embodiment shown in more detail in FIGS. 4 and 5, a lower, driven gear-like member 80 is mounted on a shaft 84 rotatably driven by a feed motor (not shown) whereas the other, opposing upper gear-like member 82, is an idler carried on a floating shaft 86. The driven shaft and the floating shaft are substantially parallel to each other, while both are generally perpendicular to the longitudinal dimension of the strip of dunnage (the upstream-downstream direction) and generally parallel to the width dimension of the strip of dunnage and the chute.

The gear-like members 80 and 82 will rotate synchronously because of intermeshed segments or teeth. The meshing gear-like members pull the folded portions of the stock material therebetween and while doing so fix (e.g., mechanically permanently deform) the folded crumpled edge portions in a folded crumpled state. At the nip of the illustrated gear-like members, the then juxtaposed gear teeth will cause adjacent portions of the stock material to move in opposite directions while creating a shearing action between laterally adjacent teeth to form a slit through each one of the overlapped layers at each side of a thus formed tab portion.

In the illustrated embodiment the gear-like members 80 and 82 are each formed of a series of flat plates 90. This greatly facilitates production and maintenance of the gear-like members. As shown in FIG. 5, two sets of opposing gear-like members are laterally spaced on the driven and floating shafts. However, other types of feed assemblies that perform similar functions may be used, including a pair of laterally continuous rotating elements.

One embodiment of rotating stitching elements according to the invention is exemplified by the illustrated gear-like members 80 and 82 or gears, described in further detail in U.S. Pat. No. 6,035,613 which is commonly owned with the present invention and hereby incorporated herein by reference. Although particularly useful in the above described machine, other types of gears (gear-like members) may be used in place of the gears described herein, such as those disclosed in commonly owned U.S. Pat. No. 4,750,896, which is hereby incorporated herein in its entirety.

The feeding/fixing assembly 60 may also include a pressure shoe 92, illustrated in FIG. 1, biased toward the guide plate 68 between the forming assembly 58 and the gear-like members 80 and 82 to resiliently hold the central portion of the strip of dunnage and thereby help reduce jamming of the strip of dunnage as it is rapidly fed through the feeding/fixing assembly. In the illustrated embodiment the pressure shoe is formed by a leaf spring bowed in a C-shape and extending down from the frame element 76 and between the laterally spaced rotating gear-like members. The resilient bias of the pressure shoe can create back-pressure on the sheet stock material upstream of the pressure shoe to form undulations and/or crumpling of the central portion of the sheet material exiting the forming assembly 58. Other types of pressure shoes may be used in accordance with the present invention to hold and/or guide the unfolded portion of the sheet material as it passes to and/or through the feeding/fixing assembly 60.

In operation of the machine, the stock supply assembly 24 supplies stock material to the forming assembly 58. The forming assembly cooperates with the feeding/fixing assembly 60 to cause inward folding and crumpling of lateral edge portions of the at least one ply sheet stock material upon themselves to form the folded crumpled portions of a continuous strip of dunnage. The feeding/fixing assembly 60 also advances the stock material through the machine 20 and fixes the juxtaposed layers of stock material in the folded crumpled portions. As the dunnage strip travels downstream from the feeding/fixing assembly, the severing assembly 62 severs or cuts the dunnage strip into discrete sections of a desired length.

The crumpled and fixed folded portions provide increased column strength and stiffness in the longitudinal direction which helps feed the sheet stock material through the feeding/fixing assembly and out the output chute 27. The dunnage product can be produced in sections of the desired length on-demand as needed, or can be produced in batches for the delivery of a plurality of dunnage products to a packing site for use. Because the folded portions are fixed in place, the dunnage product can be handled prior without losing its shape.

Figure 6:
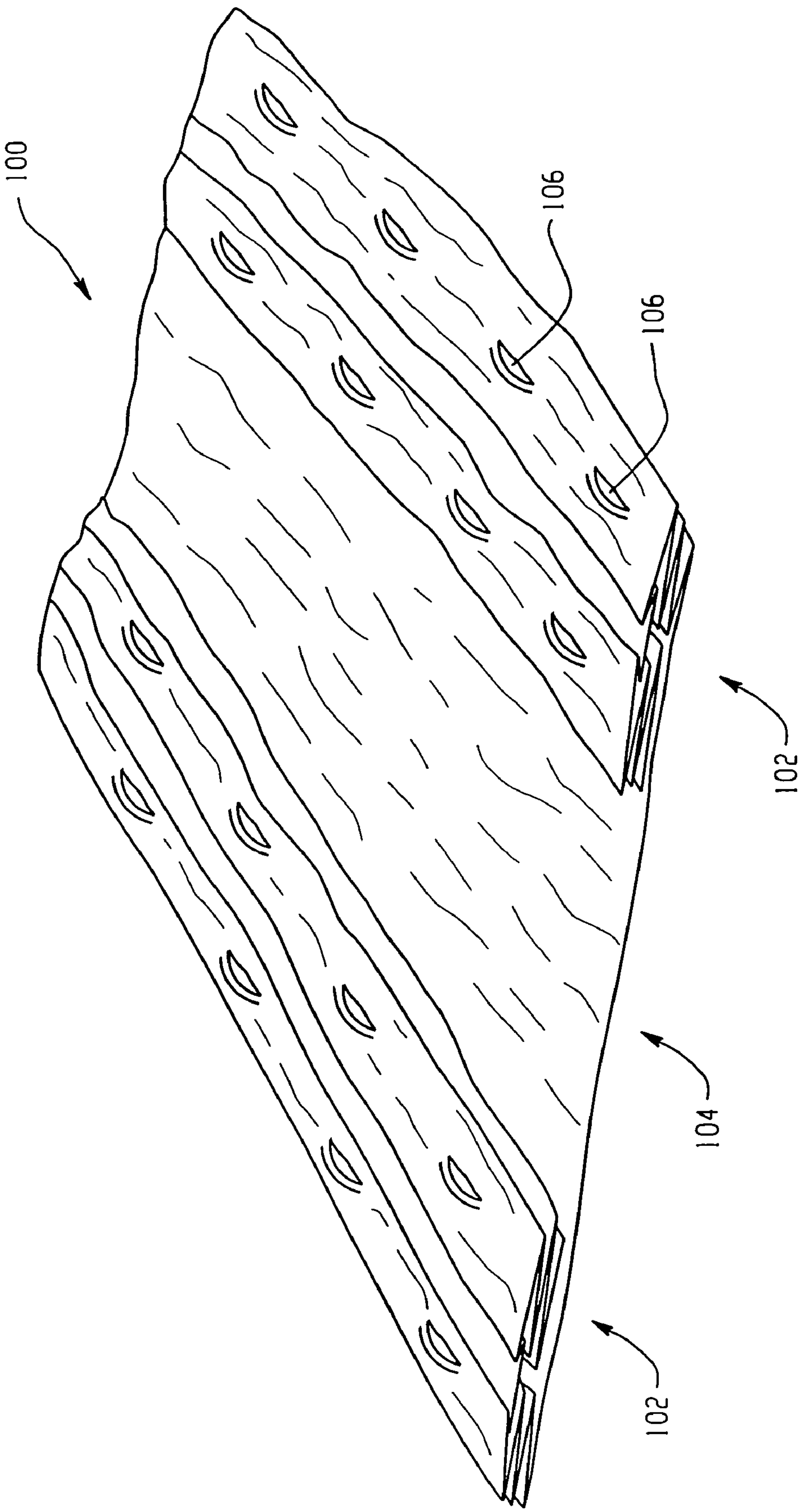
FIG. 6 is a perspective view of a dunnage product produced by the machine of FIG. 1.

Referring now to FIG. 6, a dunnage product 100 according to the invention is schematically illustrated. The dunnage product comprises at least one ply of sheet stock material having lateral edge portions thereof folded over themselves as a unit to form laterally spaced apart folded portions 102. A central portion 104 of the dunnage product separates the folded portions and in the illustrated embodiment is relatively uncrumpled compared to the folded portions. Multiple layers of stock material in the folded over portions are mechanically deformed along a pair of longitudinally extending, parallel seam lines or bands to fix the juxtaposed layers of sheet stock material in place and to retain the folded portions in a folded crumpled state. In the illustrated embodiment, tabs 106 have been formed from perforations in the folded portions to fix the juxtaposed layers of sheet stock material in the folded portions in place. Generally, the sheet stock material is biodegradable, recyclable and reusable kraft paper.

As a result of the folded and crumpled state of the folded portions, the folded portions have a greater thickness than the central portion. Consequently, the dunnage product can be described as being formed of n plies of sheet stock material with lateral portions folded upon themselves and crumpled to form laterally spaced apart folded crumpled edge portions separated by the central portion, where n is a whole number greater than or equal to one. The folded portions are at least 2*n layers thick and are separated by the central portion which is n layers thick. The asterisk is used to represent multiplication. In other words the folded portions are at least twice as thick as the central portion.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

What is claimed is:

1. A dunnage product comprising n plies of sheet stock material having a central portion with n layers, and laterally spaced apart edge portions folded upon themselves and crumpled to form laterally spaced apart folded crumpled edge portions separated by the central portion, where the folded crumpled edge portions have more than n layers and n is a whole number greater than or equal to one.

2. A dunnage product as set forth in claim 1, wherein the laterally spaced apart folded crumpled edge portions have at least 2*n layers.

3. A dunnage product as set forth in claim 1, wherein the dunnage product is formed of multiple plies of sheet stock material, where n is greater than one.

4. A dunnage product as set forth in claim 1, wherein multiple layers of sheet stock material in the folded portions are fixed to maintain the folded portions in their folded condition.

5. A dunnage product as set forth in claim 1, wherein the folded crumpled edge portions are folded over a same side of the sheet stock material.

6. A dunnage product produced by a process comprising the following steps: causing laterally spaced apart edge portions of a sheet stock material to fold and to crumple inwardly while leaving a central portion separating the folded crumpled edge portions over which the laterally spaced edge portions are not folded and fixing the folded crumpled edge portions in a folded crumpled state.

7. A dunnage product as set forth in claim 6, wherein the causing step includes feeding the sheet stock material through a forming assembly.

8. A dunnage product as set forth in claim 6, wherein the causing step includes causing the laterally spaced apart edge portions to fold over a same side of the sheet stock material.

9. A dunnage product as set forth in claim 6, wherein the fixing step includes mechanically interlocking the layers of sheet stock material in the lateral edge portions.

10. A dunnage product as set forth in claim 6, wherein the fixing step includes perforating the layers of sheet stock material.

11. A dunnage product as set forth in claim 6, further comprising the step of severing dunnage products from a continuous strip of dunnage.

* * * * *